United States Patent
Stimm et al.

(10) Patent No.: US 10,921,946 B1
(45) Date of Patent: Feb. 16, 2021

(54) SYSTEMS AND METHODS FOR SMOOTHING VIEWS OF VIDEOS

(71) Applicant: GoPro, Inc., San Mateo, CA (US)

(72) Inventors: Daryl Stimm, Encinitas, CA (US); William Edward MacDonald, Oceanside, CA (US)

(73) Assignee: GoPro, Inc., San Mateo, CA (US)

( * ) Notice: Subject to any disclaimer, the term of this patent is extended or adjusted under 35 U.S.C. 154(b) by 259 days.

(21) Appl. No.: 16/047,486

(22) Filed: Jul. 27, 2018

(51) Int. Cl.
    *G06F 3/048* (2013.01)

(52) U.S. Cl.
    CPC .................... *G06F 3/048* (2013.01)

(58) Field of Classification Search
    None
    See application file for complete search history.

(56) References Cited

U.S. PATENT DOCUMENTS

| 2012/0092348 A1* | 4/2012 | McCutchen | G06T 3/00 345/474 |
| 2012/0206565 A1* | 8/2012 | Villmer | H04N 5/23258 348/36 |

* cited by examiner

*Primary Examiner* — William C Trapanese
(74) *Attorney, Agent, or Firm* — Esplin & Associates, PC (57) ABSTRACT

A viewing window for a spherical video may define which extents of the spherical video are viewable. Abrupt changes in the extents defined by the viewing window may result in non-smooth views of the spherical video, such as stagger, jitter, and/or other jerky motions being included in the views of the spherical video. Changes in the extents defined by the viewing window may be smoothed to provide smoother views of the spherical video.

20 Claims, 8 Drawing Sheets

SYSTEMS AND METHODS FOR SMOOTHING VIEWS OF VIDEOS

FIELD

This disclosure relates to smoothing views of videos using viewing window information.

BACKGROUND

A user may change views of a video by interacting with a device playing the video. For example, a video may be played on a mobile device and the user may interact with a touchscreen of the mobile device to change the direction of view for the video. The user's interaction with the mobile device may not be smooth and may include jerking motions. Such interaction with the mobile device may result in non-smooth views of the video.

SUMMARY

This disclosure relates to smoothing views of videos. Video information, viewing window information for the spherical video content, and/or other information may be obtained. The video information may define spherical video content. The spherical video content may have a progress length and include spherical video frames that define visual content viewable from a point of view as a function of progress through the progress length. The viewing window information for the spherical video content may characterize a viewing window for the spherical video content. The viewing window may define a first set of extents of the visual content viewable from the point of view as the function of progress through the progress length. Smoothed viewing window information may be determined based on the viewing window information and/or other information. The smoothed viewing window information may characterize a smoothed viewing window for the spherical video content. The smoothed viewing window may define a second set of extents of the visual content viewable from the point of view as the function of progress through the progress length. Changes in the second set of extents may be smoother than changes in the first set of extents. The spherical video content may be presented on a display based on the smoothed viewing window information and/or other information.

A system that smooths views of videos may include one or more electronic storages, processors, and/or other components. The electronic storage may store video information defining video content (e.g., spherical video content), information relating to video content, viewing window information, information relating to viewing window, smoothed viewing window information, information relating to smoothed viewing window, and/or other information. Video content may refer to media content that may be consumed as one or more videos. Video content may include one or more videos stored in one or more formats/containers, and/or other video content. Video content may have a progress length. Video content may define visual content viewable as a function of progress through the progress length of the video content. Visual content of the video content may be included within video frames of the video content. That is, video content may include video frames that define visual content of the video content.

Video content may include spherical video content and/or other video content. Spherical video content may include spherical video frames that define visual content viewable from a point of view as a function of progress through the progress length of the spherical video content. The spherical video content may be captured by one or more image capture devices. In some implementations, the video content (e.g., spherical video content) may be consumed as virtual reality content.

The processor(s) may be configured by machine-readable instructions. Executing the machine-readable instructions may cause the processor(s) to facilitate smoothing views of videos. The machine-readable instructions may include one or more computer program components. The computer program components may include one or more of a video information component, a viewing window component, a margin information component, a smoothed viewing window component, a presentation component, and/or other computer program components.

The video information component may be configured to obtain video information and/or other information. The video information may define spherical video content. The spherical video content may have a progress length. The spherical video content may include spherical video frames that define visual content viewable from a point of view as a function of progress through the progress length. The video information component may obtain video information from one or more storage locations. The video information component may obtain video information during acquisition of the video content and/or after acquisition of the video content by one or more image sensors/image capture devices.

The viewing window component may be configured to obtain viewing window information for the video content (e.g., spherical video content) and/or other information. The viewing window information may characterize a viewing window for the video content (e.g., spherical video content). The viewing window may define a first set of extents of the visual content viewable from the point of view as the function of progress through the progress length.

In some implementations, the viewing window may be defined based on a user's interaction with a display during presentation of the video content (e.g., spherical video content) on the display and/or other information. The user's interaction with the display may include the user's engagement with the display to make one or more panning gestures and/or one or more rotating gestures on the display. The user's interaction with the display may include the user's engagement with the display to make one or more stretching gestures and/or one or more pinching gestures on the display.

The margin information component may be configured to obtain margin information and/or other information. The margin information may define one or more margin constraints. A margin constraint may limit deviations of a smoothed viewing window from the viewing window.

The smoothed viewing window component may be configured to determine smoothed viewing window information based on the viewing window information and/or other information. The smoothed viewing window information may characterize a smoothed viewing window for the video content (e.g., spherical video content). The smoothed viewing window may define a second set of extents of the visual content viewable from the point of view as the function of progress through the progress length. Changes in the second set of extents may be smoother than changes in the first set of extents. In some implementations, differences between the first set of extents and the second set of extents may be limited by the margin constraint(s).

In some implementations, the viewing window may be characterized by viewing directions as the function of progress through the progress length, and the changes in the first set of extents may include changes in the viewing directions. In some implementations, the viewing window may be characterized by viewing sizes as the function of progress through the progress length, and the changes in the first set of extents may include changes in the viewing sizes. In some implementations, the viewing window may be characterized by viewing rotations as the function of progress through the progress length, and the changes in the first set of extents may include changes in the viewing rotations.

In some implementations, the first set of extents may include a first extent corresponding to a first moment within the progress length, a second extent corresponding to a second moment within the progress length, and/or other extents corresponding to other moments within the progress length. The second set of extents may include a third extent corresponding to the first moment within the progress length, a fourth extent corresponding to the second moment within the progress length, and/or other extents corresponding to other moments within the progress length. Changes between the first extent and the second extent may include a sharp change at a third moment between the first moment and the second moment. The smoothed viewing window may be determined such that changes between the third extent and the fourth extent include a smooth change at the third moment.

In some implementations, based on the first moment corresponding to a beginning of a given change in the first set of extents and the second moment corresponding to an end of the given change in the first set of extents, the third extent may be determined to be same as the first extent and the fourth extent may be determined to be same as the second extent.

The presentation component may be configured to present the video content (e.g., spherical video content) on a display based on the smoothed viewing window information and/or other information.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a," "an," and "the" include plural referents unless the context clearly dictates otherwise.

DETAILED DESCRIPTION

Figure 1:
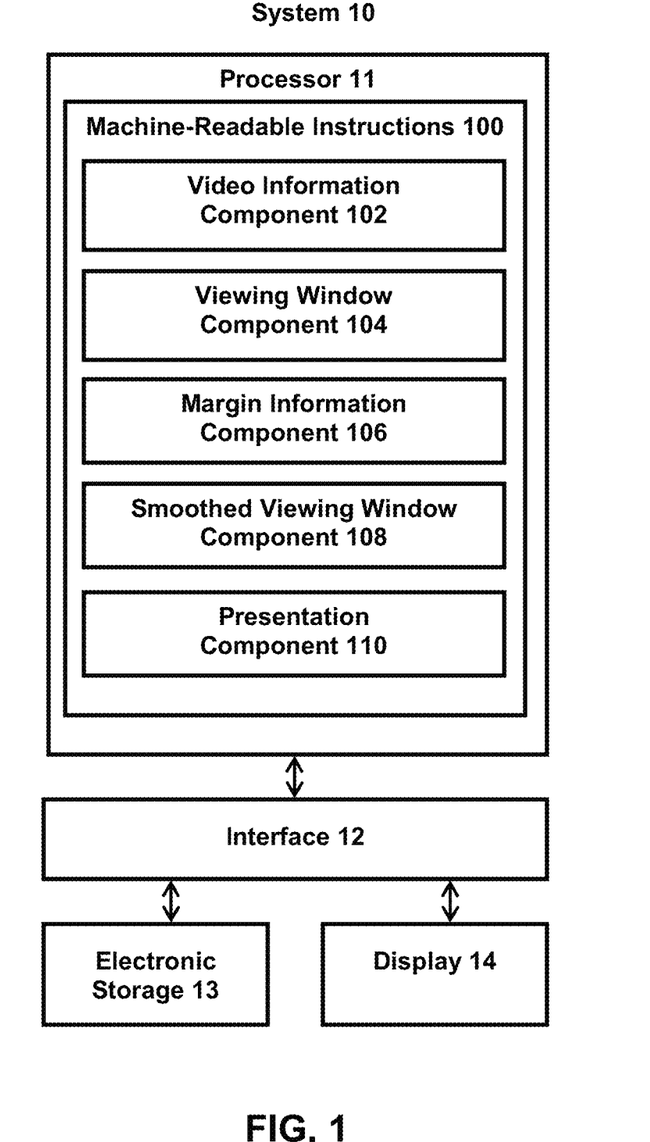
FIG. 1 illustrates a system that smooths views of videos.

FIG. 1 illustrates a system 10 for smoothing views of videos. The system 10 may include one or more of a processor 11, an interface 12 (e.g., bus, wireless interface), an electronic storage 13, a display 14, and/or other components. Video information, viewing window information for the spherical video content, and/or other information may be obtained by the processor 11. The video information may define spherical video content. The spherical video content may have a progress length and include spherical video frames that define visual content viewable from a point of view as a function of progress through the progress length. The viewing window information for the spherical video content may characterize a viewing window for the spherical video content. The viewing window may define a first set of extents of the visual content viewable from the point of view as the function of progress through the progress length. Smoothed viewing window information may be determined based on the viewing window information and/or other information. The smoothed viewing window information may characterize a smoothed viewing window for the spherical video content. The smoothed viewing window may define a second set of extents of the visual content viewable from the point of view as the function of progress through the progress length. Changes in the second set of extents may be smoother than changes in the first set of extents. The spherical video content may be presented on the display 14 based on the smoothed viewing window information and/or other information.

The display 14 may include one or more devices that may present information visually. The display 14 may be configured to present video content (e.g., spherical video content) and/or other information. The display 14 may include one or more screens for presenting video content. For example, the display 14 may include a single screen in which the video content may be presented. As another example, the display 14 may include multiple screens in which the video content may be presented, with individual screens presenting portions of the video content. In some implementations, the display 14 may include a head-mounted display and the video content may be presented on the head-mounted display as virtual reality content. In some implementations, the display 14 may include a touchscreen display. A touchscreen display may be configured to receive user input/interaction during presentation of the video content. User input/interaction may be received via one or more touch-sensitive screens of the touchscreen display. The touchscreen display may generate output signals indicating one or more locations of a user's engagement with the touchscreen display.

The electronic storage 13 may be configured to include electronic storage medium that electronically stores information. The electronic storage 13 may store software algorithms, information determined by the processor 11, information received remotely, and/or other information that enables the system 10 to function properly. For example, the electronic storage 13 may store information relating to video information, video content (e.g., spherical video content), information relating to video content, viewing window information, information relating to viewing window, smoothed viewing window information, information relating to smoothed viewing window, and/or other information.

Video content may refer to media content that may be consumed as one or more videos/video clips. Video content may include one or more videos/video clips stored in one or more formats/containers, and/or other video content. A format may refer to one or more ways in which the information defining video content may be arranged/laid out (e.g., file format). A container may refer to one or more ways in which information defining video content may be arranged/laid out in association with other information (e.g., wrapper format). Video content may include a video clip captured by an image capture device, multiple video clips captured by an image capture device, and/or multiple video clips captured by different image capture devices. Video content may include multiple video clips captured at the same time and/or multiple video clips captured at different times. Video content may include a video clip processed by an image/video application, multiple video clips processed by an image/video application, and/or multiple video clips processed by different image/video applications.

Video content may have a progress length. A progress length may be defined in terms of time durations and/or frame numbers. For example, video content may include a video having a time duration of 60 seconds. Video content may include a video having 1800 video frames. Video content having 1800 video frames may have a play time duration of 60 seconds when viewed at 30 frames/second. Other progress lengths, time durations, and frame numbers are contemplated.

Video content may define visual content viewable as a function of progress through the progress length of the video content. Visual content of the video content may be included within video frames of the video content. That is, video content may include video frames that define visual content of the video content. In some implementations, video content may include one or more spherical video content, virtual reality content, and/or other video content. Spherical video content and/or virtual reality content may define visual content viewable from a point of view as a function of progress through the progress length of the spherical video/virtual reality content. Spherical video content may include spherical video frames that define visual content viewable from a point of view as a function of progress through the progress length of the spherical video content.

Spherical video content may refer to a video capture of multiple views from a location. Spherical video content may include a full spherical video capture (360-degrees of capture, including opposite poles) or a partial spherical video capture (less than 360-degrees of capture). Spherical video content may be captured through the use of one or more image capture devices (e.g., cameras, image sensors) to capture images/videos from a location. Spherical video content may be generated based on light received within a field of view of a single image sensor or within fields of view of multiple image sensors during a capture period. For example, multiple images/videos captured by multiple cameras/image sensors may be combined/stitched together to form the spherical video content. The field of view of camera(s)/image sensor(s) may be moved/rotated (e.g., via movement/rotation of optical element(s), such as lens, of the image sensor(s)) to capture multiple images/videos from a location, which may be combined/stitched together to form the spherical video content.

Visual content of the spherical video content may be included within spherical video frames of the spherical video content. A spherical video frame may include a spherical image of the spherical video content at a moment within the progress length of the spherical video content. For example, multiple images captured by multiple cameras/images sensors at a moment in time may be combined/stitched together to form a spherical video frame for the moment in time. A spherical video frame may include a full spherical image capture (360-degrees of capture, including opposite poles) or a particular spherical image capture (less than 360-degrees of capture). A spherical image (e.g., spherical video frame) may be comprised of multiple sub-images (sub-frames). Sub-images may be generated by a single image sensor (e.g., at different times as the field of view of the image sensor may be rotated) or by multiple image sensors (e.g., individual sub-images for a moment in time captured by individual image sensors and combined/stitched together to form the spherical image).

In some implementations, spherical video content may be stored with a 5.2K resolution. Using a 5.2K spherical video content may enable viewing windows (e.g., directed to a portion of a spherical video frame) for the spherical video content with resolution close to 1080p. In some implementations, spherical video content may include 12-bit video frames. In some implementations, spherical video content may be consumed as virtual reality content.

Virtual reality content may refer to content (e.g., spherical video content) that may be consumed via virtual reality experience. Virtual reality content may associate different directions within the virtual reality content with different viewing directions, and a user may view a particular direction within the virtual reality content by looking in a particular direction. For example, a user may use a virtual reality headset to change the user's direction of view. The user's direction of view may correspond to a particular direction of view within the virtual reality content. For example, a forward-looking direction of view for a user may correspond to a forward direction of view within the virtual reality content.

Spherical video content and/or virtual reality content may have been captured at one or more locations. For example, spherical video content and/or virtual reality content may have been captured from a stationary position (e.g., a seat in a stadium). Spherical video content and/or virtual reality content may have been captured from a moving position (e.g., a moving bike). Spherical video content and/or virtual reality content may include video capture from a path taken by the capturing device(s) in the moving position. For example, spherical video content and/or virtual reality content may include video capture from a person walking around in a music festival.

Figure 3:
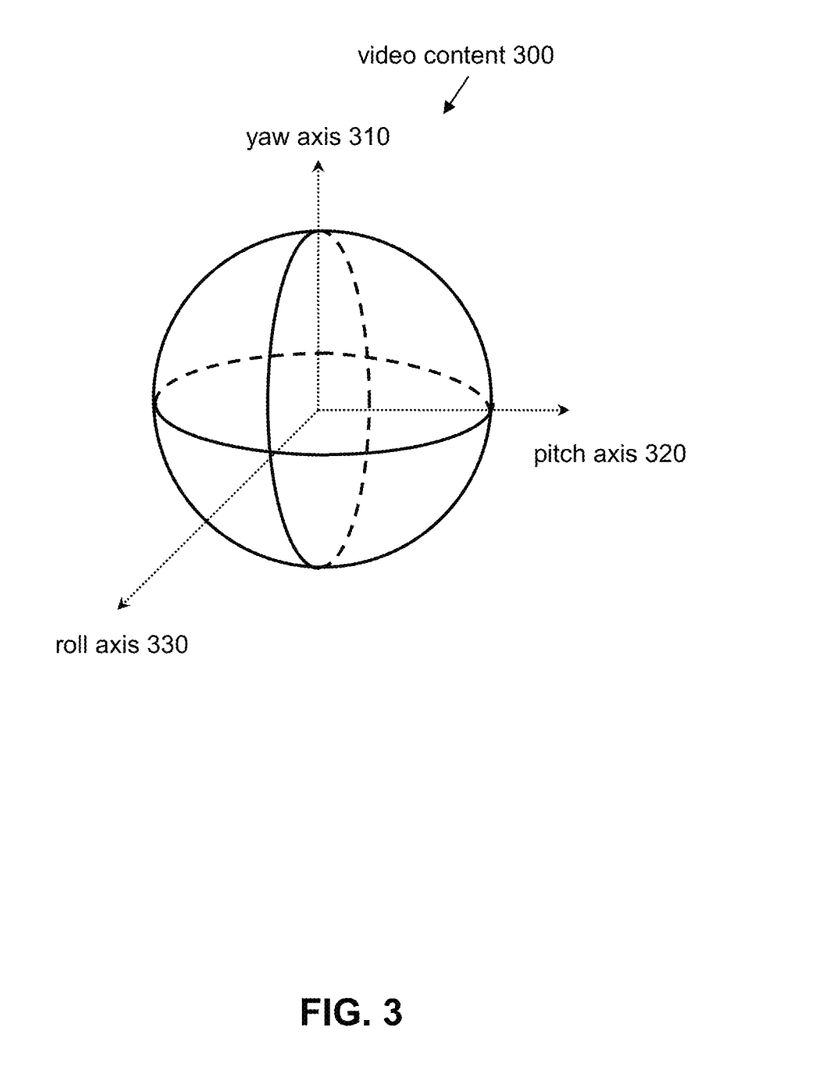
FIG. 3 illustrates an example spherical video content.

FIG. 3 illustrates an example video content 300 defined by video information. The video content 300 may include spherical video content. The video content 300 may define visual content viewable from a point of view (e.g., center of sphere) as a function of progress through the progress length of the video content 300. FIG. 3 illustrates example rotational axes for the video content 300. Rotational axes for the video content 300 may include a yaw axis 310, a pitch axis 320, a roll axis 330, and/or other axes. Rotations about one or more of the yaw axis 310, the pitch axis 320, the roll axis 330, and/or other axes may define viewing directions/viewing window for the video content 300.

For example, a 0-degree rotation of the video content 300 around the yaw axis 310 may correspond to a front viewing direction. A 90-degree rotation of the video content 300 around the yaw axis 310 may correspond to a right viewing direction. A 180-degree rotation of the video content 300 around the yaw axis 310 may correspond to a back-viewing direction. A −90-degree rotation of the video content 300 around the yaw axis 310 may correspond to a left viewing direction.

A 0-degree rotation of the video content 300 around the pitch axis 320 may correspond to a viewing direction that may be level with respect to horizon. A 45-degree rotation of the video content 300 around the pitch axis 320 may correspond to a viewing direction that may be pitched up with respect to horizon by 45-degrees. A 90-degree rotation of the video content 300 around the pitch axis 320 may correspond to a viewing direction that may be pitched up with respect to horizon by 90-degrees (looking up). A −45-degree rotation of the video content 300 around the pitch axis 320 may correspond to a viewing direction that may be pitched down with respect to horizon by 45-degrees. A −90-degree rotation of the video content 300 around the pitch axis 320 may correspond to a viewing direction that may be pitched down with respect to horizon by 90-degrees (looking down).

A 0-degree rotation of the video content 300 around the roll axis 330 may correspond to a viewing direction that may be upright. A 90-degree rotation of the video content 300 around the roll axis 330 may correspond to a viewing direction that may be rotated to the right by 90-degrees. A −90-degree rotation of the video content 300 around the roll axis 330 may correspond to a viewing direction that may be rotated to the left by 90-degrees. Other rotations and viewing directions are contemplated.

A playback of video content (e.g., the video content 300) may include presentation of one or more portions of the video content on one or more displays (e.g., the display 14) based on a viewing window and/or other information. The viewing window may define extents of the visual content viewable on one or more displays as the function of progress through the progress length of the video content. The viewing window may define extents of the visual content presented on the display(s) as the function of progress through the progress length of the video content. For spherical video content, the viewing window may define extents of the visual content viewable from the point of view as the function of progress through the progress length of the spherical video content.

The viewing window may be characterized by viewing directions, viewing sizes (e.g., viewing zoom, viewing magnification), viewing rotations, and/or other information. A viewing direction may define a direction of view for video content. A viewing direction may define the angle/visual portion of the video content at which the viewing window may be directed. A viewing direction may define a direction of view for the video content selected by a user, defined by instructions for viewing the video content, and/or determined based on other information about viewing the video content as a function of progress through the progress length of the video content (e.g., director track specifying viewing direction to be presented during playback as a function of progress through the progress length of the video content). For spherical video content, a viewing direction may define a direction of view from the point of view from which the visual content may be defined. Viewing directions for the video content may be characterized by rotations around the yaw axis 310, the pitch axis 320, the roll axis 330, and/or other axes. For example, a viewing direction of a 0-degree rotation of the video content around a yaw axis (e.g., the yaw axis 310) and a 0-degree rotation of the video content around a pitch axis (e.g., the pitch axis 320) may correspond to a front viewing direction (the viewing window may be directed to a forward portion of the visual content captured within the spherical video content).

Figure 4:
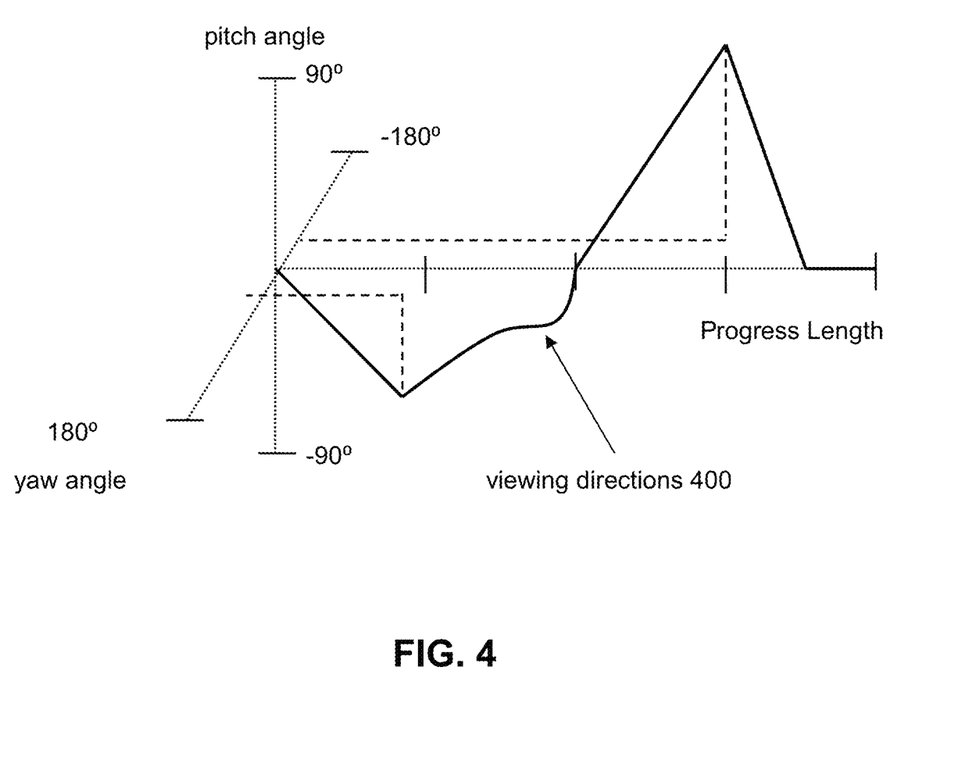
FIG. 4 illustrates example viewing directions for spherical video content.

For example, FIG. 4 illustrates example changes in viewing directions 400 (e.g., selected by a user for video content, specified by a director's track) as a function of progress through the progress length of the video content. The viewing directions 400 may change as a function of progress through the progress length of the video content. For example, at 0% progress mark, the viewing directions 400 may correspond to a zero-degree yaw angle and a zero-degree pitch angle. At 25% progress mark, the viewing directions 400 may correspond to a positive yaw angle and a negative pitch angle. At 50% progress mark, the viewing directions 400 may correspond to a zero-degree yaw angle and a zero-degree pitch angle. At 75% progress mark, the viewing directions 400 may correspond to a negative yaw angle and a positive pitch angle. At 87.5% progress mark, the viewing directions 400 may correspond to a zero-degree yaw angle and a zero-degree pitch angle. Other viewing directions are contemplated.

A viewing size may define a size (e.g., size, magnification, viewing angle) of viewable extents of visual content within the video content. A viewing size may define the dimensions of the viewing window. A viewing size may define a size of viewable extents of visual content within the video content selected by a user, defined by instructions for viewing the video content, and/or determined based on other information about viewing the video content as a function of progress through the progress length of the video content (e.g., director track specifying viewing size to be presented as a function of progress through the progress length of the video content). In some implementations, a viewing size may define different shapes of viewable extents. For example, a viewing window may be shaped as a rectangle, a triangle, a circle, and/or other shapes.

A viewing rotation may define a rotation of the viewing window. A viewing rotation may define one or more rotations of the viewing window about one or more axis. In some implementations, a viewing rotation may be defined by one or more parameters of a viewing direction. For example, a viewing rotation may be defined based on rotation about an axis (e.g., the roll axis 330) corresponding to a viewing direction. A viewing rotation may define a rotation of the viewing window selected by a user, defined by instructions for viewing the video content, and/or determined based on other information about viewing the video content as a function of progress through the progress length of the video content (e.g., director track specifying viewing rotation to be used as a function of progress through the progress length of the video content). For example, a viewing rotation of a viewing window having a rectangular shape may determine whether the rectangular viewing window is to be positioned in a portrait orientation (e.g., for a portrait view of the video content), in a landscape orientation (e.g., for a landscape view of the video content), and/or other orientation with respect to the visual content of the video content.

Figure 5A:
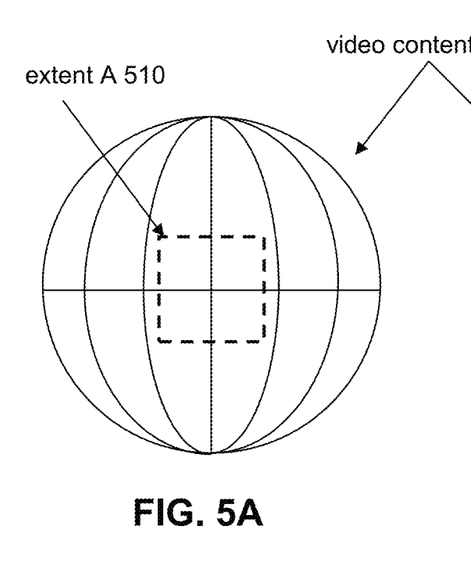
FIGS. 5A-5B illustrate example extents of spherical video content.
Figure 5B:
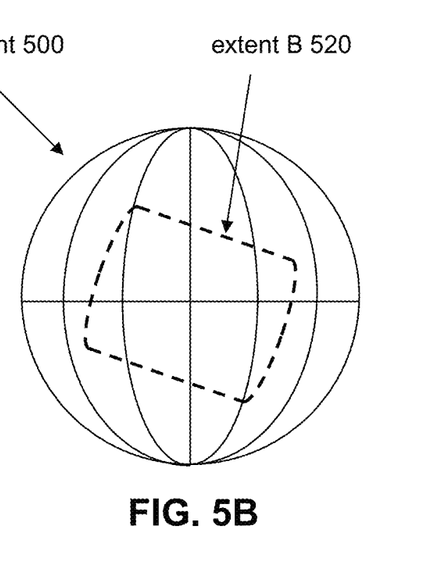

FIGS. 5A-5B illustrate examples of extents for video content 500. In FIG. 5A, the size of the viewable extent of the video content 500 may correspond to the size of extent A 510. In FIG. 5B, the size of viewable extent of the video content 500 may correspond to the size of extent B 520. Viewable extent of the video content 500 in FIG. 5A may be smaller than viewable extent of the video content 500 in FIG. 5B. The viewable extent of the video content 500 in FIG. 5B may be more tilted with respect to the video content 500 than viewable extent of the video content 500 in FIG. 5A. Other viewing sizes and viewing rotations are contemplated.

Referring to FIG. 1, the processor 11 may be configured to provide information processing capabilities in the system 10. As such, the processor 11 may comprise one or more of a digital processor, an analog processor, a digital circuit designed to process information, a central processing unit, a graphics processing unit, a microcontroller, an analog circuit designed to process information, a state machine, and/or other mechanisms for electronically processing information. The processor 11 may be configured to execute one or more machine-readable instructions 100 to facilitate smoothing views of videos. The machine-readable instructions 100 may include one or more computer program components. The machine-readable instructions 100 may include one or more of a video information component 102, a viewing window component 104, a margin information component 106, a smoothed viewing window component 108, a presentation component 110, and/or other computer program components.

The video information component 102 may be configured to obtain video information defining one or more video content (e.g., spherical video content) and/or other information. Obtaining video information may include one or more of accessing, acquiring, analyzing, determining, examining, identifying, loading, locating, opening, receiving, retrieving, reviewing, storing, and/or otherwise obtaining the video information. The video information component 102 may obtain video information from one or more locations. For example, the video information component 102 may obtain video information from a storage location, such as the electronic storage 13, electronic storage of information and/or signals generated by one or more image sensors, electronic storage of a device accessible via a network, and/or other locations. The video information component 102 may obtain video information from one or more hardware components (e.g., an image sensor) and/or one or more software components (e.g., software running on a computing device).

The video information component 102 may be configured to obtain video information defining one or more video content during acquisition of the video content and/or after acquisition of the video content by one or more image sensors/image capture devices. For example, the video information component 102 may obtain video information defining a video while the video is being captured by one or more image sensors/image capture devices. The video information component 102 may obtain video information defining a video after the video has been captured and stored in memory (e.g., the electronic storage 13).

In some implementations, the video information component 102 may obtain video information based on user interaction with a user interface/application (e.g., video editing application), and/or other information. For example, a user interface/application may provide option(s) for a user to select one or more video content in which views are to be smoothed. The video information defining the video content may be obtained based on the user's selection of the video content through the user interface/video application. Other selections of video content are contemplated.

The viewing window component 104 may be configured to obtain viewing window information for the video content (e.g., spherical video content) and/or other information. Obtaining viewing window information may include one or more of accessing, acquiring, analyzing, determining, examining, identifying, loading, locating, opening, receiving, retrieving, reviewing, storing, and/or otherwise obtaining the viewing window information. The viewing window information component 104 may obtain viewing window information from one or more locations. For example, the viewing window information component 104 may obtain viewing window information from a storage location, such as the electronic storage 13, electronic storage of information and/or signals generated by one or more sensors, electronic storage of a device accessible via a network, and/or other locations. The viewing window information component 104 may obtain viewing window information from one or more hardware components and/or one or more software components (e.g., software running on a computing device).

The viewing window information may characterize a viewing window for the video content (e.g., spherical video content). For example, the viewing window may define a set of extents of the visual content of spherical video content viewable from the point of view as the function of progress through the progress length of the spherical video content. A set of extents of the visual content may include one or more extents of the visual content. The viewing window may define a set of extents of the visual content as the function of progress through the progress length of the video content such that the viewing window define the same extent or different extents of the visual content through the progress length of the video content. The viewing window may define a set of extents based on changes in the viewing direction, the viewing size, and/or the viewing rotation. For example, the viewing window may define a set of extents of the visual content of spherical video content based on changes in the direction of view for the spherical video content, such as shown in the viewing directions 400 (shown in FIG. 4). The extent of the visual content of the spherical video content within the viewing window may change as a function of progress through the progress length of the spherical video content based on changes in the viewing directions 400.

Figure 6:
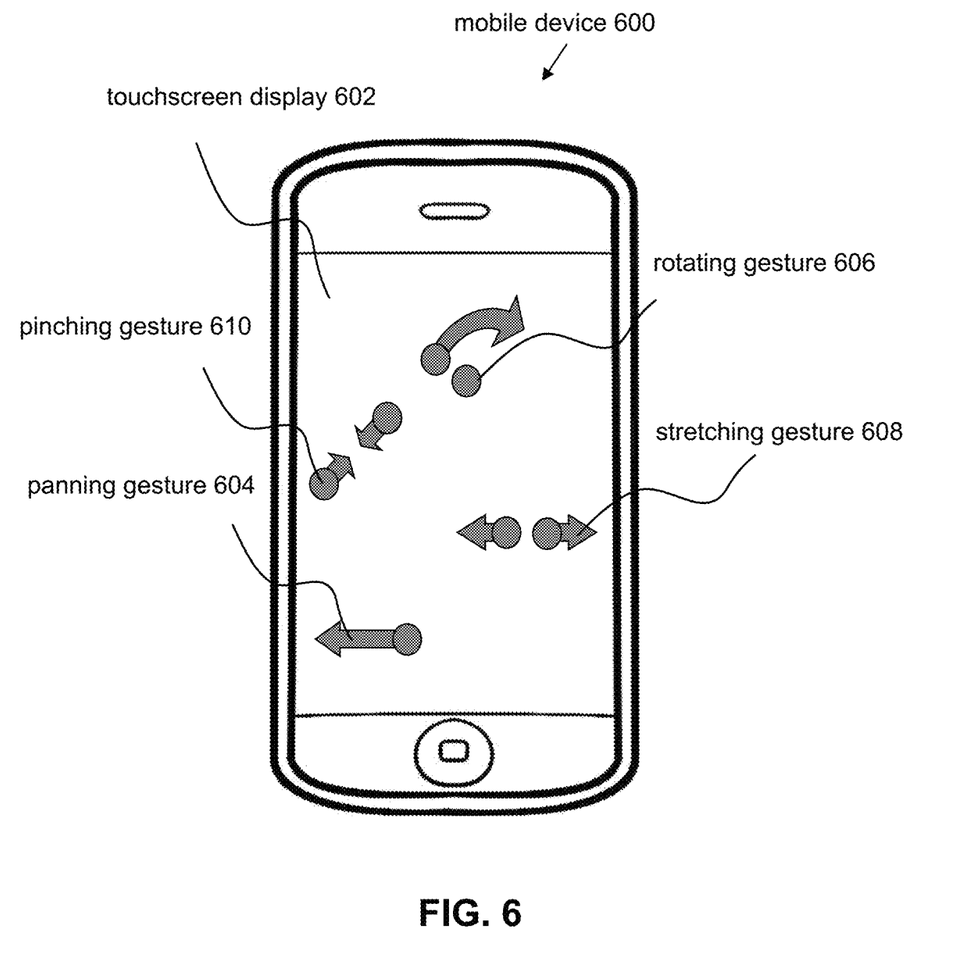
FIG. 6 illustrates example interactions with a display.

In some implementations, the viewing window may be defined based on a user's interaction with a display during presentation of the video content (e.g., spherical video content) on the display and/or other information. That is, the user may define the parameters (e.g., viewing direction, viewing size, viewing rotation) of the viewing window by interacting with the display during presentation of the video content. For example, FIG. 6 illustrates a mobile device 600 including a touchscreen display 602. The user may define the viewing window for video content by interacting with the touchscreen display 602 during presentation of the video content on the touchscreen display 602.

The user's interaction with the touchscreen display 602 may include the user's engagement with the touchscreen display 602 to make one or more gestures on the touchscreen display 602. For instance, the user may make one or more panning gestures (e.g., a panning gesture 604), one or more rotating gestures (e.g., a rotating gesture 606), one or more stretching gestures (e.g., a stretching gesture 608), one or more pinching gestures (e.g., a pinching gesture 610), and/or other gestures on the touchscreen display 602. The gesture(s) on the touchscreen display 602 may define one or more parameters of the viewing window. For example, the panning gesture 604 may change the viewing direction for the video content in a lateral direction (e.g., to the left, to the right, around yaw axis). The rotating gesture 606 may change the viewing rotation for the video content in a clockwise or anti-clockwise direction. The stretching gesture 608 may change the viewing size for the video content by zooming in on the portion of the video content in the middle of the stretching gesture 608. The pinching gesture 610 may change the viewing size for the video content by zooming out of the video content (e.g., zooming out from the portion of the video content in the middle of the pinching gesture 610).

The user's interaction with the display may include the user's movement of the display and/or a device including the display. For example, the mobile device 600 may include one or more motion/rotation sensors (e.g., accelerometer, gyroscope, inertial measurement unit, magnetometer) and the user's interaction with the display may include the user moving the mobile device 600 rotationally and/or transversally. For example, the user may move the mobile device 600 laterally to change the viewing direction for the video content in a lateral direction. The user may rotate the mobile device 600 about the yaw axis and/or the pitch axis to change the viewing direction for the video content in the direction of rotation (e.g., rotating to the right, left, pitch-up, pitch-down). The user may rotate the mobile device 600 (e.g., tilt to right, left) to change the viewing rotation for the video content. The user may move the mobile device forward or back to change the viewing size for the video content (e.g., zoom in or zoom out).

Using a user's interaction with a display to define a viewing window for video content may result in unsmooth views of the video content. For example, the touchscreen display 602 may include a glass surface or a protective surface that may cause the stretching gesture 608 to be jerky. For instance, the user's finger(s) may catch on the touchscreen display 602 and the jerky motion of the finger(s) may result in a jerky zoom-in on the video content. That is, rather than smoothly changing the zoom with which the video content may be viewed, the change in zoom for viewing the video content may include stagger, jitter, and/or other jerk in change.

As another example, using the panning gesture 604 to change the direction of view for the video content may require the user to make multiples of the panning gesture 604. For instance, the panning gesture 604 may lead the user's finger(s) to reach the edge of the touchscreen display 602, making the user lift and reposition the finger(s) on the touchscreen display 602 to resume the panning gesture 604. Such a user interaction may result in the viewing direction for the video content changing in a lateral direction, then stopping at a particular viewing direction (during the time that the user may be lifting and repositioning the finger(s)), and then resuming the change in the lateral direction.

As another example, using the movement of the mobile device 600 to change the parameters of viewing window for the video content may result in the change in viewing direction, the viewing rotation, and/or the viewing size including jitters due to shaking of the mobile device in the user's hand and/or other jerky motion due to unstable movement of the mobile device 600. Other undesirable changes in parameters of the viewing window due to the user's interaction with the display are contemplated.

The margin information component 106 may be configured to obtain margin information and/or other information. Obtaining margin information may include one or more of accessing, acquiring, analyzing, determining, examining, identifying, loading, locating, opening, receiving, retrieving, reviewing, storing, and/or otherwise obtaining the margin information. The margin information component 106 may obtain margin information from one or more locations. For example, the margin information component 106 may obtain margin information from a storage location, such as the electronic storage 13, electronic storage of information and/or signals generated by one or more sensors, electronic storage of a device accessible via a network, and/or other locations. The margin information component 106 may obtain margin information from one or more hardware components and/or one or more software components (e.g., software running on a computing device).

The margin information may define one or more margin constraints. A margin constraint may refer to one or more constraints by which one or more parameters (e.g., viewing direction, viewing size, viewing rotation) of a viewing window may be changed. A margin constraint may provide one or more ranges of margin with which one or more parameters of a viewing window may be changed. A margin constraint may limit deviations of a smoothed viewing window from the viewing window. A smoothed viewing window may include smoother changes in parameters than the viewing window from which it may be generated. For example, a smoothed viewing window may include smoother changes in viewing directions than the viewing window from which it may be generated. The margin constraint may provide one or more margins to limit how much the parameters of the smoothed viewing window may differ from the parameters of the viewing window. Such margin(s) may preserve the intention of the user in changing the parameters for viewing video content while removing jitters, stagger, and/or other jerky motions (e.g., removing high-frequency vibrations).

Figure 7:
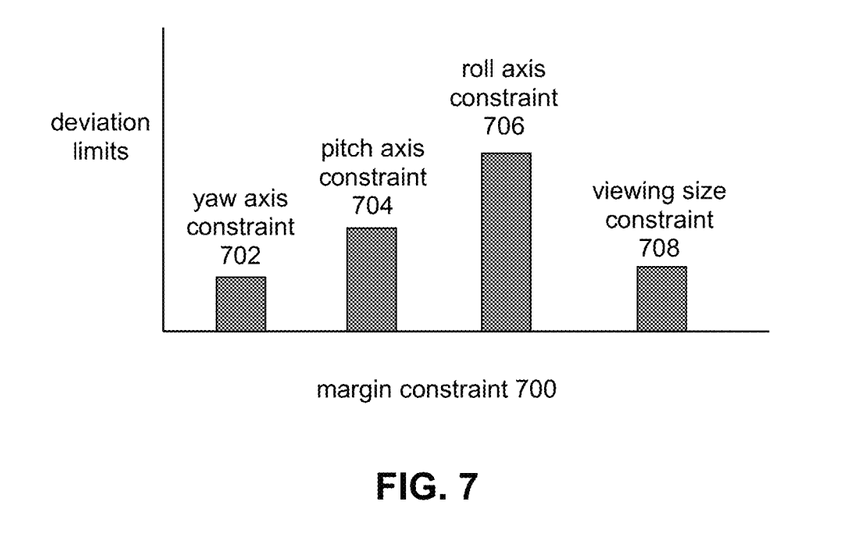
FIG. 7 illustrates an example margin constraint.

A margin constraint may provide the same or different deviation limits on the parameters of the viewing window. For example, FIG. 7 illustrates an example margin constraint 700 including different deviation limits for different parameters of the viewing window. The margin constraint 700 may include a yaw axis constraint 702, a pitch axis constraint 704, a roll axis constraint 706, and a viewing size constraint 708. The yaw axis constraint 702 and the pitch axis constraint 704 may limit the amount of deviations with respect to the change in viewing directions for the smoothed viewing window. The roll axis constraint 706 may limit the amount of deviations with respect to the change in viewing rotations for the smoothed viewing window. The viewing size constraint 708 may limit the amount of deviations with respect to the change in viewing sizes for the smoothed viewing window.

The margin constraint 700 may provide for different deviation limits with the yaw axis constraint 702, the pitch axis constraint 704, the roll axis constraint 706, and the viewing size constraint 708. For example, determination of the smoothed viewing window based on the margin constraint 700 may allow for greater deviation in the roll of a viewing direction then the yaw of the viewing direction. Determination of the smoothed viewing window based on the margin constraint 700 may allow for greater changes of the viewing rotation than the viewing size of the viewing window to determine the smoothed viewing window. Use of such a margin constraint may allow for different smoothing of different parameters of the viewing window.

The smoothed viewing window component 108 may be configured to determine smoothed viewing window information based on the viewing window information and/or other information. The smoothed viewing window information may characterize a smoothed viewing window for the video content (e.g., spherical video content). The smoothed viewing window component 108 may determine the smoothed viewing window information based on the viewing window information to smooth (e.g., stabilize) the viewing window characterized by the viewing window information. That is, the smoothed viewing window characterized by the smoothed viewing window information may be a smoother version of the viewing window characterized by the viewing window information. The changes in one or more parameters (e.g., viewing direction, viewing size, viewing rotation) of the smoothed viewing window may be smoother than changes in one or more parameters of the viewing window.

For example, the viewing window may define a first set of extents of the visual content of spherical video content viewable from a point of view as a function of progress through a progress length of the spherical video content and the smoothed viewing window may define a second set of extents of the visual content viewable from the point of view as the function of progress through the progress length. Changes in the second set of extents may be smoother than changes in the first set of extents. In some implementations, differences between the first set of extents and the second set of extents may be limited by the margin constraint(s).

For example, the viewing window may be characterized by viewing directions as the function of progress through the progress length, and the changes in the first set of extents may include changes in the viewing directions. Changes in the second set of extents may include smoother changes in the viewing directions for the smoothed viewing window. The viewing window may be characterized by viewing sizes as the function of progress through the progress length, and the changes in the first set of extents may include changes in the viewing sizes. Changes in the second set of extents may include smoother changes in the viewing sizes for the smoothed viewing window. The viewing window may be characterized by viewing rotations as the function of progress through the progress length, and the changes in the first set of extents may include changes in the viewing rotations. Changes in the second set of extents may include smoother changes in the viewing rotations for the smoothed viewing window.

Figure 8:
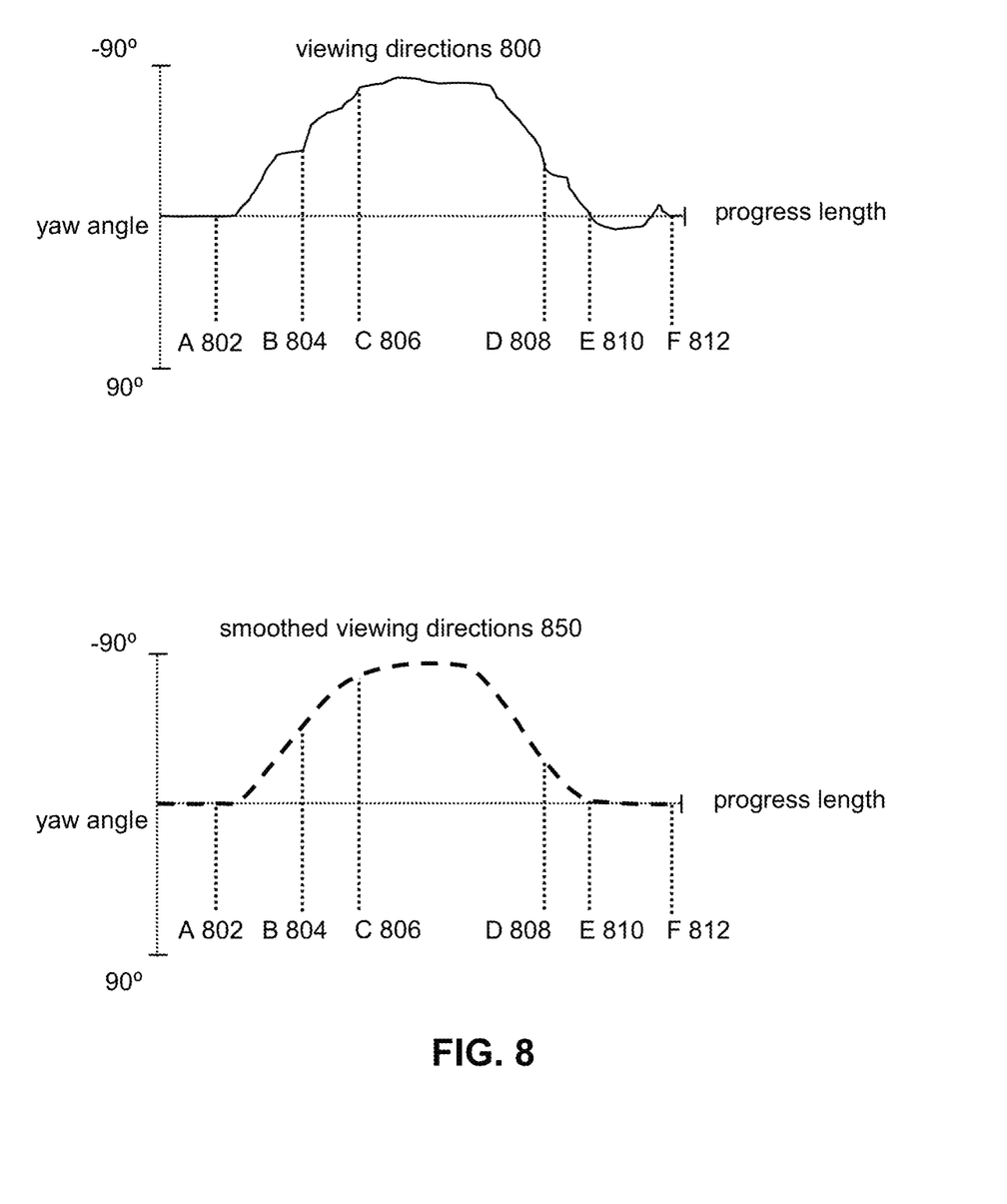
FIG. 8 illustrates example viewing directions, and example smoothed viewing directions.

For example, the first set of extents defined by the viewing window may be characterized by viewing directions 800 shown in FIG. 8. The viewing directions 800 may be defined based on a user's interaction with a display during presentation of the video content on the display and/or other information. The second set of extents defined by the smoothed viewing window may be characterized by smoothed viewing directions 850 shown in FIG. 8. The smoothed viewing window component 108 may determine the smoothed viewing window information characterizing the smoothed viewing window by smoothing the viewing directions 800 into the smoothed viewing directions 850. The smoothed viewing directions 850 may replace one or more jumps in the viewing directions 800 with one or more linear/curved ramps to provide for a smoother change in viewing directions.

For example, the first set of extents may include a first extent corresponding to a moment A 802 within the progress length, a second extent corresponding to a moment F 812 within the progress length, and/or other extents corresponding to other moments within the progress length. The second set of extents may include a third extent corresponding to the moment A 802 within the progress length, a fourth extent corresponding to the moment F 812 within the progress length, and/or other extents corresponding to other moments within the progress length. Changes between the first extent and the second extent may include one or more sharp changes at moment(s) between the moment A 802 and the moment F 812, such as at moments B 804, C 806, and D 808 due to sharp changes in the viewing directions 800. The smoothed viewing window may be determined such that changes between the third extent and the fourth extent include one or more smooth changes at the moments B 804, C 806, and D 808 due to smooth changes in the smoothed viewing directions 850.

The smoothed viewing directions 850 may be determined from the viewing directions 800 using one or more smoothing and/or stabilization techniques, such as the use of a smoothing spline function and/or other functions. The smoothed viewing window information may be determined using the smoothed viewing directions 850. The smoothed viewing window component 108 may smooth other parameters (e.g., viewing sizes, viewing rotations) of the viewing window to determine the smoothed viewing window information.

In some implementations, the smoothed viewing window component 108 may smooth a parameter of the viewing window based on a subsequent portion of the parameter and/or other information. Smoothing a parameter of the viewing window based on a subsequent portion of the parameter (look-ahead) may including smoothing a portion of the parameter (e.g., viewing direction) corresponding to a given moment within the progress length based on one or more portions of the parameter corresponding to one or more subsequent moments (moment(s) past the given moment) within the progress length. A subsequent moment within the progress length may be adjacent to the given moment or not adjacent to the given moment. Using the subsequent portion(s) of the parameter to smooth the parameter may enable the smoothed viewing window component 108 to determine smoothed viewing window information/ smoothed viewing window that preserves a user's intended changes in the viewing window. The user's intended changes in the viewing window may refer to changes in the extents defined by the viewing window that the user planned/meant to carry out.

One or more portions of the parameter in the "future" may be used to determine whether a particular change in the viewing window/extents defined by the viewing window was an intended change or an unintended change. For example, changes in the viewing directions 800 from a moment E 810 to a moment F 812 may include a negative change in yaw angle below zero-yaw degree, followed by a positive change in yaw angle past zero-yaw degree, followed by a negative change in yaw angle to zero-yaw degree. Such fluctuation of the viewing directions 800 around the zero-yaw degree may indicate that the user intended to change the viewing directions from a positive yaw degree to zero-yaw degree, but overshot the change to go past the zero-yaw degree, then overcorrected the yaw angle above the zero-yaw degree before arriving at the zero-yaw degree. The smoothed viewing directions 850 at the moment E 810 may be determined based on the subsequent portion of the viewing directions 800 (look ahead) so that the smoothed viewing directions 850 smoothly lands at zero yaw degree at the moment E 810. Other smoothing of parameter of the viewing window based on a subsequent portion of the parameter are contemplated.

In some implementations, the smoothed viewing window component 108 may preserve one or more extents of the visual content defined by the viewing window in the smoothed viewing window. For example, an extent of the visual content at the beginning of a change in extents and/or an extent of the visual content at the end of the change in extents of the viewing window may be preserved within the smoothed viewing window. For example, the moment A 802 may correspond to a change in viewing directions 800 for the first set of extents and the moment 912 may correspond to the end of the change in the viewing directions 800. For instance, the moment A 802 may correspond to a moment in the progress length of the video content at which user interacted with the display presenting the video content to change the viewing directions 800 and the moment F 812 may correspond to a moment in the progress length of the video content at which user stopped interacting with the display. Based on the moment A 802 corresponding to the beginning of the change in the first set of extents of the viewing window and the moment F 812 corresponding to the end of the change in the first set of extents of the viewing window, the extent of the second set of extents of the smoothed viewing window corresponding to the moment A 802 may be determined to be the same as the extent of the first set of extents of the viewing window at the moment A 802 and the extent of the second set of extents of the smoothed viewing window corresponding to the moment F 812 may be determined to be the same as the extent of the first set of extents of the viewing window at the moment F 812. Such preservation of the extents may preserve the user's intent in making changes to the viewing window by preserving the beginning and end of viewing window selected by the user.

The presentation component 110 may be configured to present the video content (e.g., spherical video content) on one or more displays (e.g., the display 14) based on the smoothed viewing window information and/or other information. For example, based on smoothed viewing directions (such as shown in FIG. 8), particular extents of the video content may be presented on a display (e.g., the display 14). Such presentation of the video content may provide for a smoothed view of the video content.

The presentation of the video content based on the smoothed viewing window information may be provided as a "default" or "automatic" view for the video content. That is, rather than presenting the video content based on the viewing window information, the video content may be presented based on the smoothed viewing window information. Such presentation of the video content may make the users think and/or believe that they created the smoothed view of the video content, rather than that they created the (unsmoothed) view of the video content which was smoothed by the smoothed viewing window component 108.

In some implementations, the presentation component 110 may be configured to generate one or more video edits of the video content. A video edit may refer to a particular arrangement and/or manipulation of one or more portions (e.g., video clips) of the video content. A video edit, such as a video summary, may include portion(s) of the video content to provide an overview of the video content. A video edit may include extents of the video content within the smoothed viewing window. That is, the presentation component 110 may generate a video edit of the video content based on the smoothed viewing window information.

Smoothed viewing window information and/or other information defining smoothed viewing window may be stored in one or more storage media. For example, the smoothed viewing window information may be stored in the electronic storage 13, remote storage locations (storage media located at/accessible through a server), and/or other locations. In some implementations, the smoothed viewing window information may be stored through one or more intermediary devices. For example, the processor 11 may be located within a computing device without a connection to the storage device (e.g., the computing device lacks WiFi/cellular connection to the storage device). The smoothed viewing window information may be stored through another device that has the necessary connection (e.g., the computing device using a WiFi/cellular connection of a paired mobile device, such as a smartphone, tablet, laptop, to store information in one or more storage media). Other storage locations for and storage of the smoothed viewing window information are contemplated.

While the description herein may be directed to video content, one or more other implementations of the system/method described herein may be configured for other types media content. Other types of media content may include one or more of audio content (e.g., music, podcasts, audiobooks, and/or other audio content), multimedia presentations, images, slideshows, visual content (one or more images and/or videos), and/or other media content.

Implementations of the disclosure may be made in hardware, firmware, software, or any suitable combination thereof. Aspects of the disclosure may be implemented as instructions stored on a machine-readable medium, which may be read and executed by one or more processors. A machine-readable medium may include any mechanism for storing or transmitting information in a form readable by a machine (e.g., a computing device). For example, a tangible computer-readable storage medium may include read-only memory, random access memory, magnetic disk storage media, optical storage media, flash memory devices, and others, and a machine-readable transmission media may include forms of propagated signals, such as carrier waves, infrared signals, digital signals, and others. Firmware, software, routines, or instructions may be described herein in terms of specific exemplary aspects and implementations of the disclosure, and performing certain actions.

In some implementations, some or all of the functionalities attributed herein to the system 10 may be provided by external resources not included in the system 10. External resources may include hosts/sources of information, computing, and/or processing and/or other providers of information, computing, and/or processing outside of the system 10.

Although the processor 11, the electronic storage 13, and the display 14 are shown to be connected to the interface 12 in FIG. 1, any communication medium may be used to facilitate interaction between any components of the system 10. One or more components of the system 10 may communicate with each other through hard-wired communication, wireless communication, or both. For example, one or more components of the system 10 may communicate with each other through a network. For example, the processor 11 may wirelessly communicate with the electronic storage 13. By way of non-limiting example, wireless communication may include one or more of radio communication, Bluetooth communication, Wi-Fi communication, cellular communication, infrared communication, or other wireless communication. Other types of communications are contemplated by the present disclosure.

Although the processor 11 is shown in FIG. 1 as a single entity, this is for illustrative purposes only. In some implementations, the processor 11 may comprise a plurality of processing units. These processing units may be physically located within the same device, or the processor 11 may represent processing functionality of a plurality of devices operating in coordination. The processor 11 may be configured to execute one or more components by software; hardware; firmware; some combination of software, hardware, and/or firmware; and/or other mechanisms for configuring processing capabilities on the processor 11.

It should be appreciated that although computer components are illustrated in FIG. 1 as being co-located within a single processing unit, in implementations in which the processor 11 comprises multiple processing units, one or more of computer program components may be located remotely from the other computer program components.

While computer program components are described herein as being implemented via the processor 11 through machine-readable instructions 100, this is merely for ease of reference and is not meant to be limiting. In some implementations, one or more functions of computer program components described herein may be implemented via hardware (e.g., dedicated chip, field-programmable gate array) rather than software. One or more functions of computer program components described herein may be software-implemented, hardware-implemented, or software and hardware-implemented The description of the functionality provided by the different computer program components described herein is for illustrative purposes, and is not intended to be limiting, as any of computer program components may provide more or less functionality than is described. For example, one or more of computer program components may be eliminated, and some or all of its functionality may be provided by other computer program components. As another example, the processor 11 may be configured to execute one or more additional computer program components that may perform some or all of the functionality attributed to one or more of computer program components described herein.

The electronic storage media of the electronic storage 13 may be provided integrally (i.e., substantially non-removable) with one or more components of the system 10 and/or removable storage that is connectable to one or more components of the system 10 via, for example, a port (e.g., a USB port, a Firewire port, etc.) or a drive (e.g., a disk drive, etc.). The electronic storage 13 may include one or more of optically readable storage media (e.g., optical disks, etc.), magnetically readable storage media (e.g., magnetic tape, magnetic hard drive, floppy drive, etc.), electrical charge-based storage media (e.g., EPROM, EEPROM, RAM, etc.), solid-state storage media (e.g., flash drive, etc.), and/or other electronically readable storage media. The electronic storage 13 may be a separate component within the system 10, or the electronic storage 13 may be provided integrally with one or more other components of the system 10 (e.g., the processor 11). Although the electronic storage 13 is shown in FIG. 1 as a single entity, this is for illustrative purposes only. In some implementations, the electronic storage 13 may comprise a plurality of storage units. These storage units may be physically located within the same device, or the electronic storage 13 may represent storage functionality of a plurality of devices operating in coordination.

Figure 2:
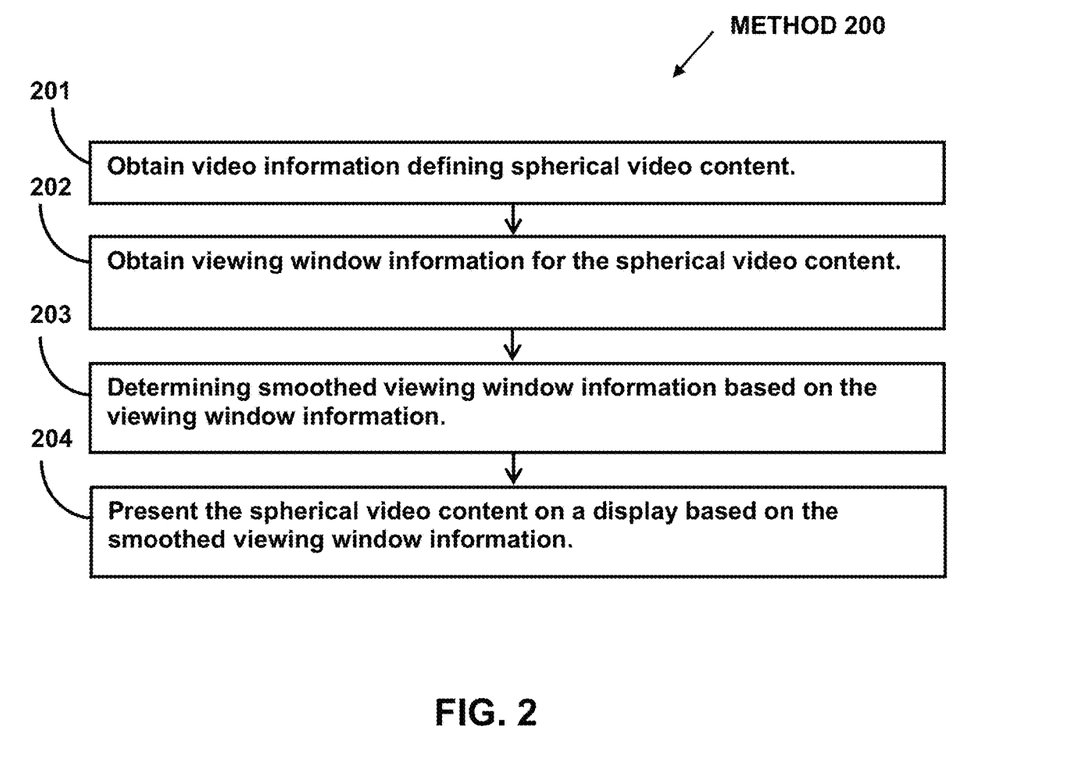
FIG. 2 illustrates a method for smoothing views of videos.

FIG. 2 illustrates method 200 for smoothing views of videos. The operations of method 200 presented below are intended to be illustrative. In some implementations, method 200 may be accomplished with one or more additional operations not described, and/or without one or more of the operations discussed. In some implementations, two or more of the operations may occur substantially simultaneously.

In some implementations, method 200 may be implemented in one or more processing devices (e.g., a digital processor, an analog processor, a digital circuit designed to process information, a central processing unit, a graphics processing unit, a microcontroller, an analog circuit designed to process information, a state machine, and/or other mechanisms for electronically processing information). The one or more processing devices may include one or more devices executing some or all of the operation of method 200 in response to instructions stored electronically on one or more electronic storage mediums. The one or more processing devices may include one or more devices configured through hardware, firmware, and/or software to be specifically designed for execution of one or more of the operation of method 200.

Referring to FIG. 2 and method 200, at operation 201, video information defining spherical video content may be obtained. The spherical video content may have a progress length. The spherical video content may include spherical video frames that define visual content viewable from a point of view as a function of progress through the progress length. In some implementation, operation 201 may be performed by a processor component the same as or similar to the video information component 102 (Shown in FIG. 1 and described herein).

At operation 202, viewing window information for the spherical video content may be obtained. The viewing window information may characterize a viewing window for the spherical video content. The viewing window may define a first set of extents of the visual content viewable from the point of view as the function of progress through the progress length. In some implementations, operation 202 may be performed by a processor component the same as or similar to the viewing window component 104 (Shown in FIG. 1 and described herein).

At operation 203, smoothed viewing window information may be determined based on the viewing window information. The smoothed viewing window information may characterize a smoothed viewing window for the spherical video content. The smoothed viewing window may define a second set of extents of the visual content viewable from the point of view as the function of progress through the progress length. Changes in the second set of extents may be smoother than changes in the first set of extents. In some implementations, operation 203 may be performed by a processor component the same as or similar to the smoothed viewing window component 108 (Shown in FIG. 1 and described herein).

At operation 204, the spherical video content may be presented on a display based on the smoothed viewing window information. In some implementations, operation 204 may be performed by a processor component the same as or similar to the presentation component 110 (Shown in FIG. 1 and described herein).

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A system that smooths views of videos, the system comprising:
 one or more physical processors configured by machine-readable instructions to:
  obtain video information defining spherical video content, the spherical video content having a progress length and including spherical video frames that define visual content viewable from a point of view as a function of progress through the progress length;

obtain viewing window information for the spherical video content, the viewing window information characterizing a viewing window for the spherical video content, the viewing window defining a first set of extents of the visual content viewable from the point of view as the function of progress through the progress length, wherein the viewing window is defined based on a user's interaction with a touchscreen display during a prior presentation of the spherical video content on the touchscreen display, the user's interaction with the touchscreen display including engagement of one or more fingers of the user with the touchscreen display, further wherein unsmooth engagement of the one or more fingers of the user with the touchscreen display results in unsmooth changes in the first set of extents such that the unsmooth engagement of the one or more fingers of the user with the touchscreen display during a user input duration results in generation of an unsmooth path of viewing directions for the viewing window, the unsmooth path of viewing directions including stagger, jitter, or jerk in the viewing directions due to stagger, jitter, or jerk in the unsmooth engagement of the one or more fingers of the user with the touchscreen display during the user input duration;

determine smoothed viewing window information based on the viewing window information, the smoothed viewing window information characterizing a smoothed viewing window to be used in place of the viewing widow in a subsequent presentation of the spherical video content, the smoothed viewing window defining a second set of extents of the visual content viewable from the point of view as the function of progress through the progress length, wherein changes in the second set of extents are smoother than the unsmooth changes in the first set of extents such that the a smoothed path of viewing directions for the viewing window is determined to be used in place of the unsmooth path of viewing directions, the smoothed path of viewing directions determined by smoothing the stagger, the jitter, or the jerk in the unsmoothed path of viewing directions; and present the spherical video content on the touchscreen display based on the smoothed viewing window information.

2. The system of claim 1, wherein:

the one or more physical processors are further configured by the machine-readable instructions to obtain margin information, the margin information defining a margin constraint that limits differences between the first set of extents and the second set of extents.

3. The system of claim 2, wherein the margin constraint includes independent constraints for yaw, pitch, roll, and viewing size of the viewing window such that the margin constraint includes a yaw axis constraint, a pitch axis constraint, a roll axis constraint, and a viewing size constraint, the yaw axis constraint independently limiting differences in yaw viewing directions for the viewing window and the smoothed viewing window, the pitch axis constraint independently limiting differences in pitch viewing directions for the viewing window and the smoothed viewing window, the roll axis constraint independently limiting differences between viewing rotations for the viewing window and the smoothed viewing window, and the viewing size constraint independently limiting differences between viewing sizes for the viewing window and the smoothed viewing window.

4. The system of claim 1, wherein the viewing window is characterized by viewing directions as the function of progress through the progress length, and the changes in the first set of extents include changes in the viewing directions.

5. The system of claim 1, wherein the viewing window is characterized by viewing sizes as the function of progress through the progress length, and the changes in the first set of extents include changes in the viewing sizes.

6. The system of claim 1, wherein the viewing window is characterized by viewing rotations as the function of progress through the progress length, and the changes in the first set of extents include changes in the viewing rotations.

7. The system of claim 1, wherein the user's interaction with the touchscreen display includes the user's engagement with the touchscreen display to make a panning gesture or a rotating gesture on the touchscreen display.

8. The system of claim 1, wherein the user's interaction with the touchscreen display include the user's engagement with the touchscreen display to make a stretching gesture or a pinching gesture on the touchscreen display.

9. The system of claim 1, wherein:

the first set of extents includes a first extent corresponding to a first moment within the progress length and a second extent corresponding to a second moment within the progress length;

the second set of extents includes a third extent corresponding to the first moment within the progress length and a fourth extent corresponding to the second moment within the progress length;

changes between the first extent and the second extent include a sharp change at a third moment between the first moment and the second moment; and the smoothed viewing window is determined such that changes between the third extent and the fourth extent include a smooth change at the third moment.

10. The system of claim 9, wherein based on the first moment corresponding to a beginning of a given change in the first set of extents and the second moment corresponding to an end of the given change in the first set of extents, the third extent is determined to be same as the first extent and the fourth extent is determined to be same as the second extent.

11. A method for smoothing views of videos, the method performed by a computing system including one or more processors, the method comprising:

obtaining, by the computing system, video information defining spherical video content, the spherical video content having a progress length and including spherical video frames that define visual content viewable from a point of view as a function of progress through the progress length;

obtaining, by the computing system, viewing window information for the spherical video content, the viewing window information characterizing a viewing window for the spherical video content, the viewing window defining a first set of extents of the visual content viewable from the point of view as the function of progress through the progress length, wherein the viewing window is defined based on a user's interaction with a touchscreen display during a prior presentation of the spherical video content on the touchscreen display, the user's interaction with the touchscreen display including engagement of one or more fingers of the user with the touchscreen display, further wherein unsmooth engagement of the one or more fingers of the user with the touchscreen display results in unsmooth changes in the first set of extents such that the unsmooth engagement of the one or more fingers of the user with the touchscreen display during a user input duration results in generation of an unsmooth path of viewing directions for the viewing window, the unsmooth path of viewing directions including stagger, jitter, or jerk in the viewing directions due to stagger, jitter, or jerk in the unsmooth engagement of the one or more fingers of the user with the touchscreen display during the user input duration;

determining, by the computing system, smoothed viewing window information based on the viewing window information, the smoothed viewing window information characterizing a smoothed viewing window to be used in place of the viewing widow in a subsequent presentation of the spherical video content, the smoothed viewing window defining a second set of extents of the visual content viewable from the point of view as the function of progress through the progress length, wherein changes in the second set of extents are smoother than the unsmooth changes in the first set of extents such that the a smoothed path of viewing directions for the viewing window is determined to be used in place of the unsmooth path of viewing directions, the smoothed path of viewing directions determined by smoothing the stagger, the jitter, or the jerk in the unsmoothed path of viewing directions; and presenting, by the computing system, the spherical video content on the touchscreen display based on the smoothed viewing window information.

12. The method of claim 11, further comprising obtaining margin information, the margin information defining a margin constraint that limits differences between the first set of extents and the second set of extents.

13. The method of claim 12, wherein the margin constraint includes independent constraints for yaw, pitch, roll, and viewing size of the viewing window such that the margin constraint includes a yaw axis constraint, a pitch axis constraint, a roll axis constraint, and a viewing size constraint, the yaw axis constraint independently limiting differences in yaw viewing directions for the viewing window and the smoothed viewing window, the pitch axis constraint independently limiting differences in pitch viewing directions for the viewing window and the smoothed viewing window, the roll axis constraint independently limiting differences between viewing rotations for the viewing window and the smoothed viewing window, and the viewing size constraint independently limiting differences between viewing sizes for the viewing window and the smoothed viewing window.

14. The method of claim 11, wherein the viewing window is characterized by viewing directions as the function of progress through the progress length, and the changes in the first set of extents include changes in the viewing directions.

15. The method of claim 11, wherein the viewing window is characterized by viewing sizes as the function of progress through the progress length, and the changes in the first set of extents include changes in the viewing sizes.

16. The method of claim 11, wherein the viewing window is characterized by viewing rotations as the function of progress through the progress length, and the changes in the first set of extents include changes in the viewing rotations.

17. The method of claim 1, wherein the user's interaction with the touchscreen display include the user's engagement with the touchscreen display to make a panning gesture or a rotating gesture on the touchscreen display.

18. The method of claim 1, wherein the user's interaction with the touchscreen display include the user's engagement with the touchscreen display to make a stretching gesture or a pinching gesture on the touchscreen display.

19. The method of claim 11, wherein:
the first set of extents includes a first extent corresponding to a first moment within the progress length and a second extent corresponding to a second moment within the progress length;
the second set of extents includes a third extent corresponding to the first moment within the progress length and a fourth extent corresponding to the second moment within the progress length;
changes between the first extent and the second extent include a sharp change at a third moment between the first moment and the second moment; and
the smoothed viewing window is determined such that changes between the third extent and the fourth extent include a smooth change at the third moment.

20. The method of claim 19, wherein based on the first moment corresponding to a beginning of a given change in the first set of extents and the second moment corresponding to an end of the given change in the first set of extents, the third extent is determined to be same as the first extent and the fourth extent is determined to be same as the second extent.

* * * * *

UNITED STATES PATENT AND TRADEMARK OFFICE
CERTIFICATE OF CORRECTION

PATENT NO. : 10,921,946 B1
APPLICATION NO. : 16/047486
DATED : February 16, 2021
INVENTOR(S) : Daryl Stimm et al.

Page 1 of 1

It is certified that error appears in the above-identified patent and that said Letters Patent is hereby corrected as shown below:

In the Claims

In Claim 17, Column 22, Line 18, please delete "claim 1" and insert --claim 11--, therefor.

In Claim 18, Column 22, Line 22, please delete "claim 1" and insert --claim 11--, therefor.

Signed and Sealed this
Twentieth Day of April, 2021

Drew Hirshfeld
*Performing the Functions and Duties of the*
*Under Secretary of Commerce for Intellectual Property and*
*Director of the United States Patent and Trademark Office*